March 31, 1942. V. T. WIGLESWORTH 2,278,031
DIRECTIONAL INDICATING DEVICE
Filed Sept. 18, 1939 3 Sheets-Sheet 1
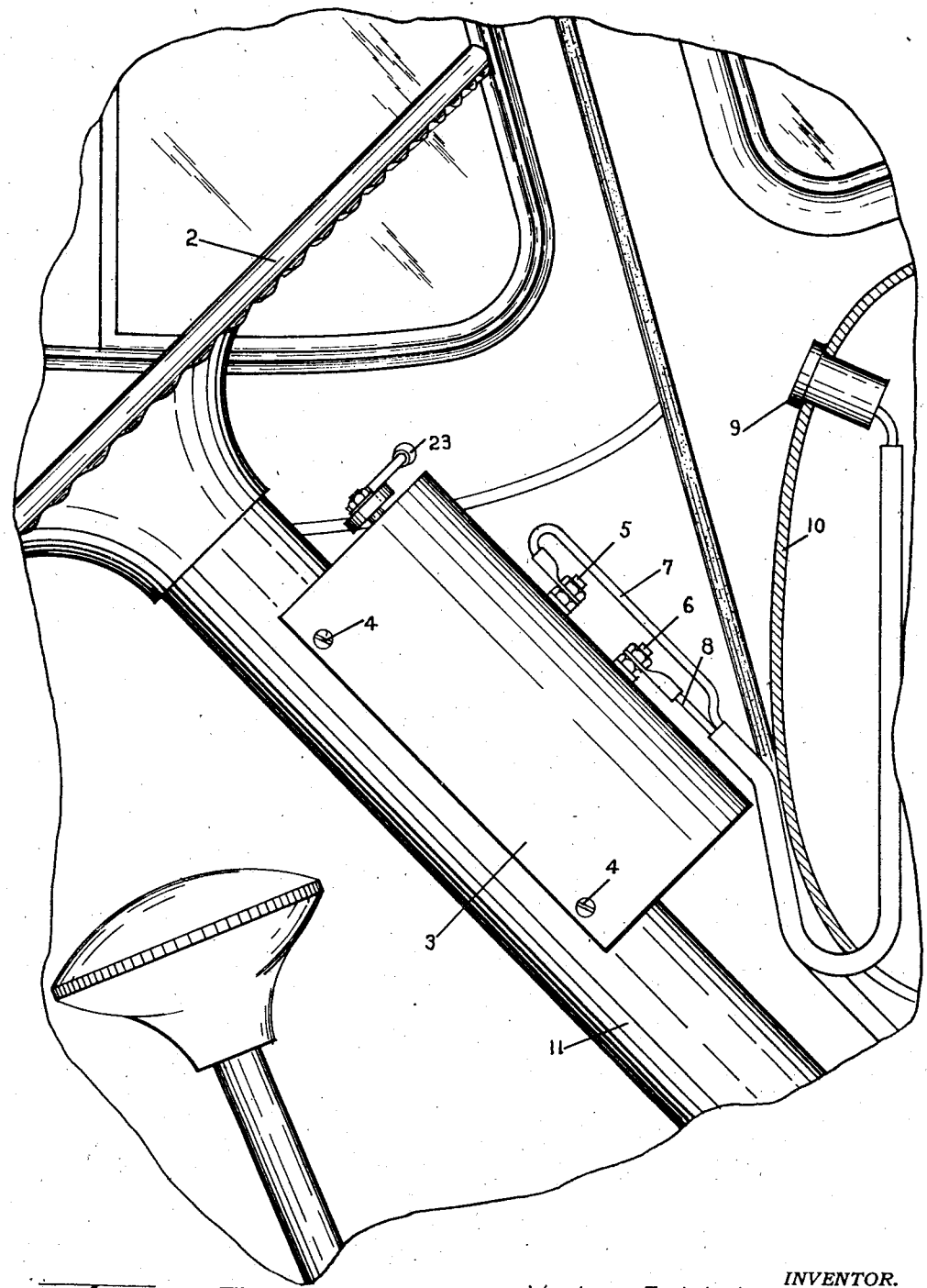
Fig I
INVENTOR.
Victor T. Wiglesworth
BY
ATTORNEY.

March 31, 1942.   V. T. WIGLESWORTH   2,278,031
DIRECTIONAL INDICATING DEVICE
Filed Sept. 18, 1939   3 Sheets-Sheet 2
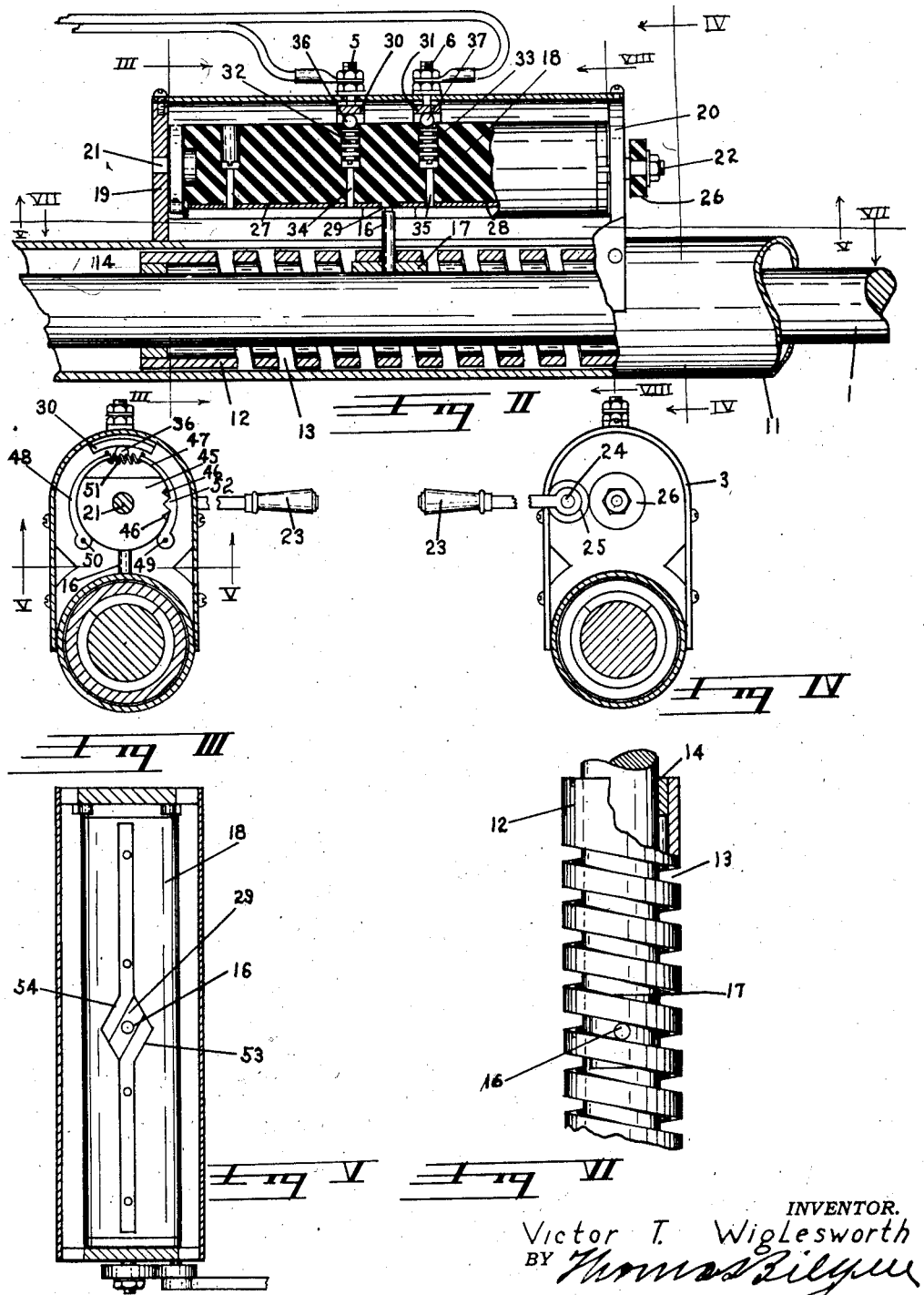
INVENTOR.
Victor T. Wiglesworth
BY
ATTORNEY.

March 31, 1942.  V. T. WIGLESWORTH  2,278,031
DIRECTIONAL INDICATING DEVICE
Filed Sept. 18, 1939   3 Sheets-Sheet 3
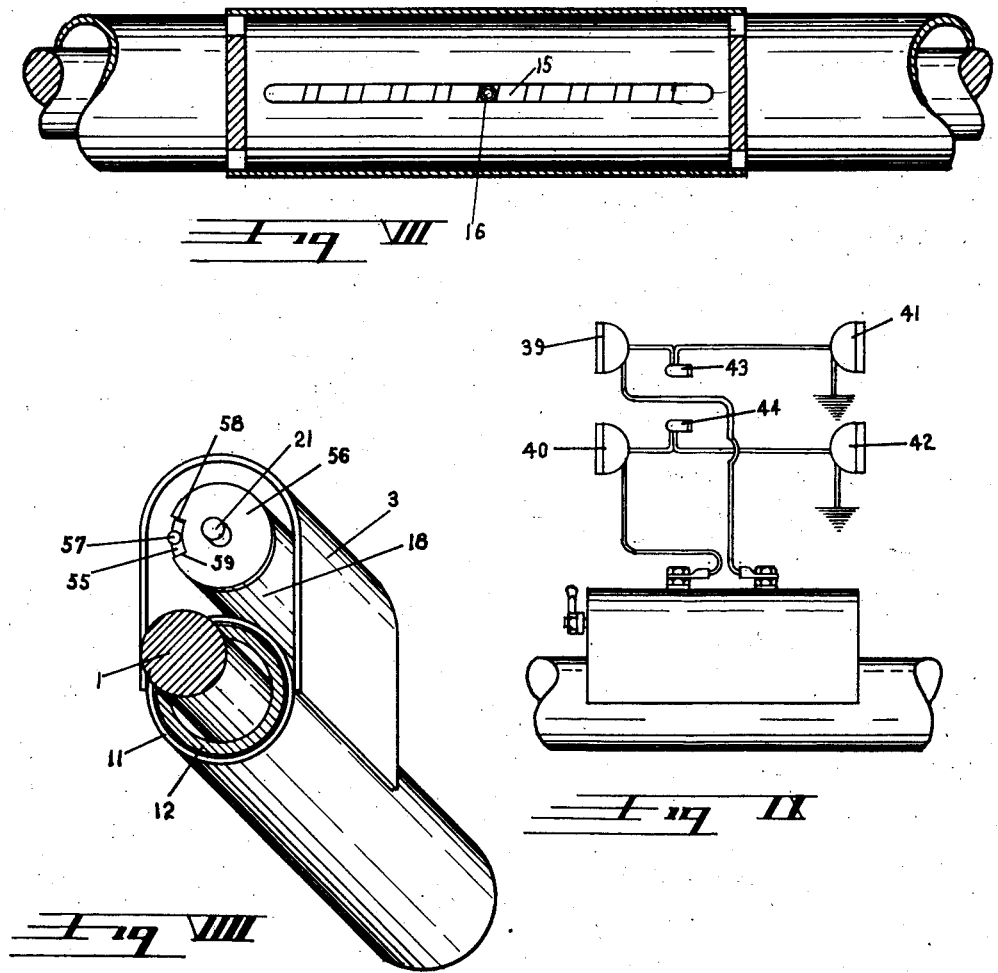
INVENTOR.
Victor T. Wiglesworth
BY
ATTORNEY.

Patented Mar. 31, 1942

2,278,031

UNITED STATES PATENT OFFICE 2,278,031

DIRECTIONAL INDICATING DEVICE

Victor T. Wiglesworth, Portland, Oreg.

Application September 18, 1939, Serial No. 295,384

5 Claims. (Cl. 200—59)

This United States patent application relates to my two United States patent applications upon the Directional indicating mechanism filed January 28, 1939, and bearing serial numbers, respectively, 253,376 and 253,377. The directional indicating devices as evidenced by the serial numbers herein referred to are intended for automatically indicating the direction of the turn that the vehicle is to make, whereas, my present application relates to a device that will automatically indicate the direction of the turn that is to be made by the vehicle after the turn is actually being made or that may be set mechanically to indicate in advance of the turn being made that a turn is to be made with automatic means being provided for returning the signaling mechanism to inoperative position when straight ahead driving is resumed after the turn has been made.

The primary purpose and object of my present invention is to provide instrumentalities through the use of which the direction that the vehicle is to be turned may be indicated in advance of the turn being made and yet one that will return the mechanism automatically to inoperative position after the turn has been made and after straight ahead driving has been resumed.

A still further object of my invention is to provide a device that is connected with automatic circuits in which lamps are disposed that will indicate in the view of the driver and at the front of the vehicle and at the rear of the vehicle that right turns and or left turns are to be made automatically as the turn is made and that will break the circuit automatically after the turn has been made to render the lamps inoperative for indicating that the turn is to be made or has been made and simultaneously to provide a manually manipulative device that will energize the circuit when actuated and that will indicate that the turn is to be made by the energizing of the electric circuit and the illuminating of the lamps disposed within the circuit that a turn is to be made in advance of the turn being made with automatic means being provided for returning the manually manipulative device to normal inoperative position and to break the circuit in which the lamps are disposed and to render the same inoperative automatically after the turn has been made and straight ahead driving is resumed.

A still further object of my present invention is to so place the device relative to the hand of the driver of the vehicle so that it may be easily reached and easily operated during which time one of the hands of the operator may be maintained upon the steering wheel of the vehicle.

A still further object of my present invention consists in constructing the device so that it will be completely automatic in its operation or that it may be selectively operated by manually operated means.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. I is a side view of the assembled device and a fragmentary, partially sectional side view of the vehicle upon which the same is installed with the device being shown as being installed upon the steering column of the vehicle.

Fig. II is a side view partially in section of my instrumentalities shown in place and in position upon the steering column.

Fig. III is a sectional end view of the mechanism illustrated in Fig. II. This view is taken on line 3—3 of Fig. II looking in the direction indicated. Fig. IV is a sectional end view of the steering column and of the steering shaft and of the mechanism being installed upon the steering column and shaft. This view is taken on line 4—4 of Fig. II looking in the direction indicated.

Fig. V is a sectional plan view of that portion of the device that is directly secured to and attached to and that is adapted for being rotated by the steering shaft when the steering shaft is rotated. This view is taken on line 5—5 of Fig. II looking in the direction indicated.

Fig. VI is a fragmentary plan view of the operating cam shown in place upon the steering shaft.

Fig. VII is a fragmentary plan view of the steering shaft and a fragmentary sectional plan view of the housing that is secured to the steering shaft and illustrating a slot within the column and through which the said slot cam is shown and the contactor pin being shown in place within the cam and in place within the slot.

Fig. VIII is a perspective end view of the steering shaft, the housing secured thereto, and the contactor maker and breaker disposed within the column and secured to the steering column and disposed within the housing.

Fig. IX is a side view of the assembled mechanism that is secured to the steering column and a diagrammatical layout of the electric circuits leading therefrom illustrating the lamps disposed within the said circuits.

Like reference characters refer to like parts throughout the several views.

I have here shown my device as being attached to a steering shaft 1 of an automotive vehicle. The steering wheel is illustrated at 2 with a housing 3 being provided for encasing the operating mechanism in order that the same may be maintained free of contamination from dust and the like. The housing 3 is removably secured to the column 11 through the use of any suitable fastening as through the use of screws 4. A pair of electric terminals 5 and 6 are disposed upon the housing 3 and electric circuit carriers 7 and 8 are secured to the respective terminals. The electric conductors lead to a source of electric energy, not here shown, as to the battery of the automotive vehicle. A pilot light 9 is disposed within the circuit. The pilot light is preferably placed in direct line with the vision of the operator of the vehicle and the same is preferably secured to the dash 10 of the vehicle or to any suitable fixed support. A tubular column 11 is disposed about the steering shaft 1. The column 11 is stationary and does not rotate as the steering shaft 1 rotates, to thereby provide a fixed support upon which the housing 3 for my device may be attached. I secure a sleeve 12 inside the steering column. The sleeve 12 is in spaced relationship with the outer surface of the steering shaft 1 excepting at its ends. A spiral groove cam 13 is cut out, otherwise formed within the surface of the sleeve between its ends. A collar 14 is disposed about the steering column 1 and at the respective ends of the sleeve 12 to precisely maintain that portion of the sleeve between the collars in uniform spaced relationship within the end of the sleeve 12. An elongated slot 15 is disposed within the column 11. A contactor pin 16 is placed within the slot 15 and the same is adapted for being moved longitudinally of the slot. The contactor pin 16 also passes through the sleeve 12 and within the camming groove 13. The contactor 16 is secured to a shoe 17 that rides directly on the outer surface of the steering shaft 1 so that as the steering shaft 1 and the sleeve 12 are rotated, the contactor 16 may be moved longitudinally of the slot.

A cylinder 18 made of suitable insulating material is mounted within the housing 3. The cylinder is supported within the end plates 19 and 20 by having pintle shafts 21 and 22 outwardly extending from the respective ends of the cylinder 18 that pass through the respective end plates to form journals thereupon.

A manually manipulative handle 23 is provided. The handle 23 is secured to a shaft 24. A compressible driving roller 25 is also mounted upon the shaft 24 so that as the handle 23 is oscillated, a rotary motion is imparted to the driving compressible wheel 25. A roller 26 is mounted upon the shaft 22. The roller 26 is in registry with, and is contacted by, the wheel 25 so that as the handle 23 is manipulated, a partial rotation will be imparted to the driven roller 26, to the shaft 22, and in turn to the insulated drum 18. The drum 18 has a pair of strip electric terminals 27 and 28 running longitudinally thereof with a gap 29 being disposed between their ends. The electric terminals 5 and 6 are indirectly connected to the terminals 27 and 28 by placing a shoe 30 under the terminal 5 to which the same is directly attached, and placing a shoe 31 in contact with the electric terminal 6. Compressible members as coil springs 32 and 33 rest upon the connector screws 34 and 35 that are directly secured to the electric terminals 27 and 28. Metal balls 36 and 37 are disposed between the shoes 31 and the respective springs 32 and 33 to form an electric contact and an electric connection between the terminals 27 and 28 and the electric terminals 5 and 6.

When the contactor pin 16 is in the position as illustrated in Fig. II, the electric terminals and the electric circuits are not energized. When the contactor pin 16 is in the position as illustrated in Fig. V as well as in Fig. II, it is in the neutral position with the contactor pin being out of engagement with either of the terminals 27 or 28.

The shoe 17 to which the contactor pin 16 is attached, rests directly upon the steering shaft 1 to which the same is grounded. As the spiral cam 13 is rotated, the shoe 17 and the contactor pin 16 are moved longitudinally of the steering shaft 1 and longitudinally of the electric terminals 27 and 28 to immediately place the contactor pin 16 in electrical contact with one or the other of the electric terminals 27 and 28 to energize the respective electric circuits 7 or 8 and to energize the lamps disposed within either of the circuits. A plurality of electric lamps are disposed within each of the circuits with the number of lamps being shown here as three, with the respective lamps 39 and 40 being disposed at either side of the vehicle, and the electric lamps 41 and 42 being disposed at the front end of the vehicle, and with pilot lights 43 and 44 being disposed within the line of vision of the operator of the vehicle, with the respective lamps 39 and 41 and 43 being connected in series, and with the respective lamps 40, 42, and 44 being connected in series, thus placing at the disposal of the operator of the vehicle indication that the circuit is an operating circuit when closed or that it is inoperative because of the lamps in either of the series being inoperative for any reason, so that automatically when the steering column is turned sufficiently to place the contactor pin in electrical engagement with either of the terminals 27 or 28, one of the circuits will be energized. When the steering shaft is returned to normal straight ahead driving, the circuit will be automatically broken when the contactor pin is placed in the gap 29 between the ends of the terminals 27 and 28.

In the event that it is desired to manually close the circuit and to indicate the turn in either direction is to be made by electrically energizing these circuits, the hand lever 23 is set to indicate that a left turn is to be made, or that a right turn is to be made, determined by the driver's intention.

A disk 45 is mounted upon the shaft 21. A plurality of indents 46, here shown as three in number are disposed in the periphery of the disk 45. Locator arms 47 and 48 are mounted upon suitable pins 49 and 50. The locator arms 47 and 48 rock about the pins 49 and 50 and are secured together at their swinging ends by a reactance means as by a coil spring 51. A tooth 52 is carried by the locator arm 47. The tooth engages the indent 46, positions the disk 45 and positions the cylinder 18. When the hand 23 is in the position as illustrated in Figs. III and IV, the contactor pin 16 is in the neutral position as illustrated in Fig. V, and in the neutral position as illustrated in Fig. II.

When the handle 23 is moved to indicate that a right or a left turn is to be made the tooth 52 moves into the indents disposed at either side of the neutral position, at which time the pin 16 is made to engage either the wall 53 or the wall 54. In doing so the electric circuit energizes the lamps disposed within the respective circuits, as for example if the left turn is to be made the electric energy will be conducted through lamps 39, 43, and 45; if all of the lamps within the circuit are in working order or the lamps 40, 42, and 44 will be energized if a right hand turn is to be indicated.

In the partial rotating of the cylinder 18 the sloping surfaces 53 or 54 are into contact with the pin 16 through the contacting of the driving roller 25 with the roller 26 by the pin 16 which moves in a straight line due to its moving longitudinally of the elongated slot 15. As the pin 16 engages the sloping surfaces, the cylinder 18 is rotated partially and simultaneously places the handle 23 in its normal position as illustrated in Figs. III and IV respectively. In the partial rotation of the cylinder 18 the disk 45 is rotated until the tooth 52 is placed into neutral position relative to the indent disclosed, in which position it is disclosed in Fig. III.

Since the locator arm 47 carries the tooth 52, the spring 51 forces contact between the tooth 52 and the indent to precisely position the arm 23 in normal placement. A modified form of escapement slot 55 as disclosed in Fig. VIII within the end plate 56 is mounted upon the shaft 21. This slot 55 takes the place of the slot 29 disclosed in Fig. V. An escapement pin 57 is mounted within the end of the cylinder 18 to thereby provide a second automatic means for closing the circuit or circuits when the steering wheel 2 is turned more than the clearance disposed between the abutments 58 and 59 disposed at the ends of the escapement slot 55 against which the pin 57 contacts and rotates thus indicating a turn is to be made before the turn is actually being made.

It is recommended that the difference in degrees between the abutments 58 and 59 be substantially fifteen degrees to conform with the standard practices being recommended by the Automotive Engineers Association practices.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, in combination with a steering wheel, comprising a cam, a contactor pin adapted for being moved longitudinally of the steering shaft as the steering shaft is rotated, means for maintaining the movement of the contactor pin in a straight line, a plurality of electric terminals spaced apart and positioned so as to be contacted by the contactor pin as the pin is moved, a carrier for the electric terminals, bearing shafts for the terminal carrier, manually settable means for rotating the electric terminal carrier, means for closing an electric circuit when the carrier is rotated and automatic means for rerotating the terminal carrier when the steering shaft is rotated beyond a predetermined amount.

2. In a device of the class described, comprising in combination, a steering shaft, a steering wheel, a cam secured to the steering shaft and adapted for being rotated as the steering shaft is rotated, an electric contactor associated with the cam and adapted for being moved in a straight line reciprocating movement when the steering shaft is rotated in normal driving, a plurality of electric terminals disposed in the normal line of travel of the electric contactor and for being contacted thereby as the steering shaft and cam are rotated, means for partially rotating the electric terminal carrier and for contacting the terminals one at a time when the carrier is partially rotated and automatic means for breaking the contact when the contact carrier is rerotated due to the rotation of the steering wheel and shaft back to normal straight ahead driving.

3. In a device of the class described comprising in combination a steering shaft, means for rotating the steering shaft, a sleeve having a cam associated therewith adapted for being rotated by the steering shaft, a contactor coacting with the cam of the sleeve, means for moving the contactor in a straight line reciprocating movement, a plurality of electric terminals spaced apart and adapted for being contacted by the contactor one at a time, a carrier for the electric terminals, manually settable means for partially rotating the carrier and to close a contact when partially rotated and automatic means for rerotating the terminal carrier when the contactor is moved a predetermined amount.

4. In a device of the class described comprising in combination, a steering shaft, a steering wheel secured to the steering shaft a cam associated with the steering shaft, a contactor pin associated with the sleeve and adapted for being moved in a straight line movement and for being moved longitudinally of the sleeve as the sleeve is rotated, a plurality of electric terminals spaced apart and disposed in the line of travel of the contactor and adapted for contacting the terminals one at a time while the contactor is in registry engagement with the electric terminal carrier, settable means for partially rotating the terminal contactor and for completing a contact when the electric terminal carrier is partially rotated and automatic means for rerotating the electric terminal carrier when the contactor is moved a predetermined distance.

5. In a device of the class described comprising in combination, a steering shaft, a housing, end plates disposed within the housing, journal bearing holders disposed in axial alignment and disposed within the end plates, an electric terminal carrier, manually settable means for partially rotating the electric terminal carrier, means for closing an electric circuit when the electric terminal carrier is partially rotated and automatic means for rerotating the electric terminal carrier to normal position when the steering shaft is rotated a predetermined amount.

VICTOR T. WIGLESWORTH.